United States Patent
Shiraishi et al.

(10) Patent No.: US 7,260,158 B2
(45) Date of Patent: Aug. 21, 2007

(54) DIGITAL BROADCAST RECEIVER AND DIGITAL BROADCAST RECEIVING METHOD

(75) Inventors: Kenichi Shiraishi, Yokohama (JP); Akihiro Horii, Zama (JP)

(73) Assignee: Kabushiki Kaisha Kenwood, Tokyo (JP)

( * ) Notice: Subject to any disclaimer, the term of this patent is extended or adjusted under 35 U.S.C. 154(b) by 783 days.

(21) Appl. No.: 10/398,943

(22) PCT Filed: Sep. 25, 2001

(86) PCT No.: PCT/JP01/08307

§ 371 (c)(1),
(2), (4) Date: Aug. 20, 2003

(87) PCT Pub. No.: WO02/33965

PCT Pub. Date: Apr. 25, 2002

(65) Prior Publication Data

US 2004/0101057 A1    May 27, 2004

(30) Foreign Application Priority Data

Oct. 13, 2000    (JP) .............................. 2000-313068

(51) Int. Cl.
*H03K 9/00* (2006.01)
*H04L 27/06* (2006.01)
*H04L 27/14* (2006.01)
*H04L 27/22* (2006.01)

(52) U.S. Cl. ...................... 375/316; 375/242; 329/300; 329/304; 329/311

(58) Field of Classification Search ................. 375/316, 375/242; 329/300, 304, 311
See application file for complete search history.

(56) References Cited

U.S. PATENT DOCUMENTS 6,505,220 B1 *   1/2003   Ikeda .......................... 708/212

FOREIGN PATENT DOCUMENTS

| JP | 09-321813   | 12/1997 |
| JP | 2000-088505 | 3/2000  |
| JP | 2000-115085 | 4/2000  |
| JP | 2000-295189 | 10/2000 |
| JP | 2001-86464  | 3/2001  |
| JP | 2001-274856 | 10/2001 |

OTHER PUBLICATIONS

Official Action for JP 2000-313068 Dated Nov. 30, 2004.

* cited by examiner

*Primary Examiner*—David C. Payne
*Assistant Examiner*—Erin M. File
(74) *Attorney, Agent, or Firm*—Eric J. Robinson; Robinson Intellectual Property Law Office, P.C.

(57) ABSTRACT

A digital broadcast receiver capable of adequately receiving a higher-level layer service along with a lower-level layer service even if the reception CNR degrades. A demodulation decoding section (2) of the receiver judges on the basis of transport and multiplexing configuration control information whether the TS packet allocated to each slot is adapted to a higher-level layer service or a lower-level layer service and informs a code writing section (3) of the result. The code writing section (3) writes, in each TS packet, a layer identification code for judging whether the TS packet is adapted to a higher-level layer service or a lower-layer service and synthesizes a resultant TS packet. A stream separating section (4) reads the layer identification code along with the PID in the packet header included in the TS packet and finds and extracts a desired TS packet.

6 Claims, 3 Drawing Sheets

(a)

(b)

DIGITAL BROADCAST RECEIVER AND DIGITAL BROADCAST RECEIVING METHOD

FIELD OF THE INVENTION

The present invention relates to a digital broadcast receiver for receiving a BS digital broadcasting service, and more particularly to a digital broadcast receiver capable of adequately receiving a higher-level layer service along with a lower-level layer service even if the reception CNR degrades.

BACKGROUND ART

BS (Broadcasting Satellite) digital broadcasting provides services such as audio, video, and data broadcasting in a plurality of levels such as a higher-level layer service and a lower-level layer service. For example, the higher-level layer service uses 8PSK (8 Phase Shift Keying) as its modulation method, and the lower-level layer service uses QPSK (Quadrature-PSK) or BPSK (Binary-PSK) as its modulation method.

A digital broadcast receiver receives a BS digital broadcasting service, and if it becomes unable to sufficiently receive a higher-level service because a reception CNR (Carrier-to-Noise Ratio) is degraded by rain or the like, it switches to a lower-level layer service to prevent the service from being intercepted.

For example, if the higher-level layer service is for HD (High Definition) video signals and the lower-level layer service is for audio signals and the reception CNR degrades to such an extent that the higher-level layer service cannot be received sufficiently, a conventional digital broadcast receiver freezes or shuts down the HD video signals of the higher-level layer service. After the HD video signals are frozen or shutdown, the conventional broadcast receiver executes a pre-stored application and displays, for example, a message to the effect that the higher-level layer service cannot be received, on a television receiver or the like.

In this case, the conventional digital broadcast receiver changes the received transport stream packet (hereinafter called a TS packet) for the higher-level layer service to a null packet. In this manner, the performance of receiving the lower-level layer service can be prevented from being degraded.

Namely, the conventional digital broadcast receiver detects a PID (packet ID) allocated to a received TS packet and corresponding to a desired program number and separates the TS packet into an audio PES (Packetized Elementary Stream) and a video PES. When the lower-level layer service is to be received, the conventional digital broadcast receiver changes the TS packet of the higher-level layer service to a null packet in accordance with transport and multiplexing configuration control (TMCC) information read from a received signal, and thereafter separates the TS packet into the audio PES and video PES. Even if the received data representative of PID has errors unable to be corrected, it is therefore possible to prevent the TS packet of the higher-level layer service from being extracted as the TS packet of the lower-level layer service.

However, the conventional digital broadcast receiver cannot receive the higher-level layer service while it receives the lower-level layer service because of rain or the like. It is therefore impossible to satisfy the user requirement of receiving the higher-level layer service even if the reception CNR is degraded.

If the audio PES and video PES are separated without changing the TS packet of the higher-level layer service to the null packet while the lower-level layer service is received, the lower-level layer service is adversely affected and cannot be received reliably although it can be received otherwise normally.

The present invention has been made under such circumstances and aims to provide a digital broadcast receiver capable of adequately receiving the higher-level layer service along with the lower-level layer service even if a reception CNR is degraded.

DISCLOSURE OF THE INVENTION

In order to achieve the above object, a digital broadcast receiver, according to a first aspect of the invention, for receiving a digital broadcast that provides a broadcast service consisting of a combination of a plurality of types of signal information such as audio information, video information and data information, wherein different hierarchical level layers of modulation schemes depending on the types of signal information are applied to the broadcast service comprises: signal demodulating means for demodulating a received signal to obtain a digital signal having a predetermined length of a packet as a unit such as a TS packet; code synthesizing means for synthesizing a level layer identification code for each packet of the digital signal demodulated by the signal demodulating means, the level layer identification code identifying the level layer of each signal information in the broadcast service corresponding to that packet; and separating means for deriving a packet adapted to the level layer of each signal information in the received broadcast service, in accordance with the level layer identification code synthesized to the packet by the code synthesizing means, and executing a separation process to output a reproduction signal such as audio and video signals.

According to the invention, the code synthesizing means synthesizes the level layer identification code for identifying each signal information in the broadcast service to each corresponding packet. The separating means can execute the separation process to output the reproduction signal by using the packet derived by the code synthesizing means in accordance with the level layer identification code synthesized by the code synthesizing means.

It is possible to reliably judge whether the packet corresponds to the signal information of which level layer, and to select the proper packet even if the reception CNR is degraded. It is possible to receive both the lower-level layer signal information service and the higher-level layer signal information service.

According to a preferred embodiment of the invention, the digital broadcast receiver further comprises control means for notifying the separating means of an identification number corresponding to signal information in the received broadcast service, among identification numbers allocated to packets on a transmission side, wherein the separating means derives a packet whose identification number allocated to the packet with the level layer identification code synthesized by the code synthesizing means is coincident with the identification number notified from the control means and whose level layer identification code synthesized to the packet by the code synthesizing means is adapted to the level layer of the signal information in the received broadcast service.

More specifically, it is preferable that the signal demodulating means identifies a modulation method to be used when each packet is transmitted from the transmission side, in accordance with transmission and multiplexing configuration control information read from the demodulated digital signal, and notifies the code synthesizing means of the level layer of signal information in the broadcast service corresponding to the identified modulation method, and that the code synthesizing means synthesizes the level layer identification code representative of the level layer of the service signal information notified from the signal demodulating means, to each packet.

It is more preferable that the code synthesizing means changes a symbol at a predetermined position in a Reed-Solomon parity contained in a packet to the level layer identification code to thereby synthesize the level layer identification code to each packet.

A digital broadcast receiving method, according to a second aspect of the invention, for receiving a digital broadcast service from a plurality of services provided as a plurality of hierarchical level layers, comprises steps of: demodulating a received signal to obtain a digital signal having a predetermined length of a packet as a unit; synthesizing a level layer identification code for identifying the level layer of a service to each corresponding packet; and deriving a packet adapted to the level layer of the signal information in the received broadcast service, in accordance with the level layer identification code synthesized to the packet, and executing a separation process to output a reproduction signal.

In the digital broadcast receiving method of the invention, it is preferable that a modulation method to be used when each packet is transmitted from the transmission side, is identified in accordance with transmission and multiplexing configuration control information read from the demodulated digital signal, and the level layer identification code representative of the level layer of service signal information corresponding to the identified modulation method, to each packet, and that a separation process of outputting a reproduction signal is executed by deriving a packet whose identification number allocated to the packet with the synthesized level layer identification code is coincident with the identification number corresponding to signal information in the received broadcast service and whose level layer identification code synthesized to the packet is adapted to the level layer of the signal information in the received broadcast service.

EMBODIMENT OF THE INVENTION

A digital broadcast receiver according to an embodiment of the invention will be described in detail with reference to the accompanying drawings.

Figure 1:
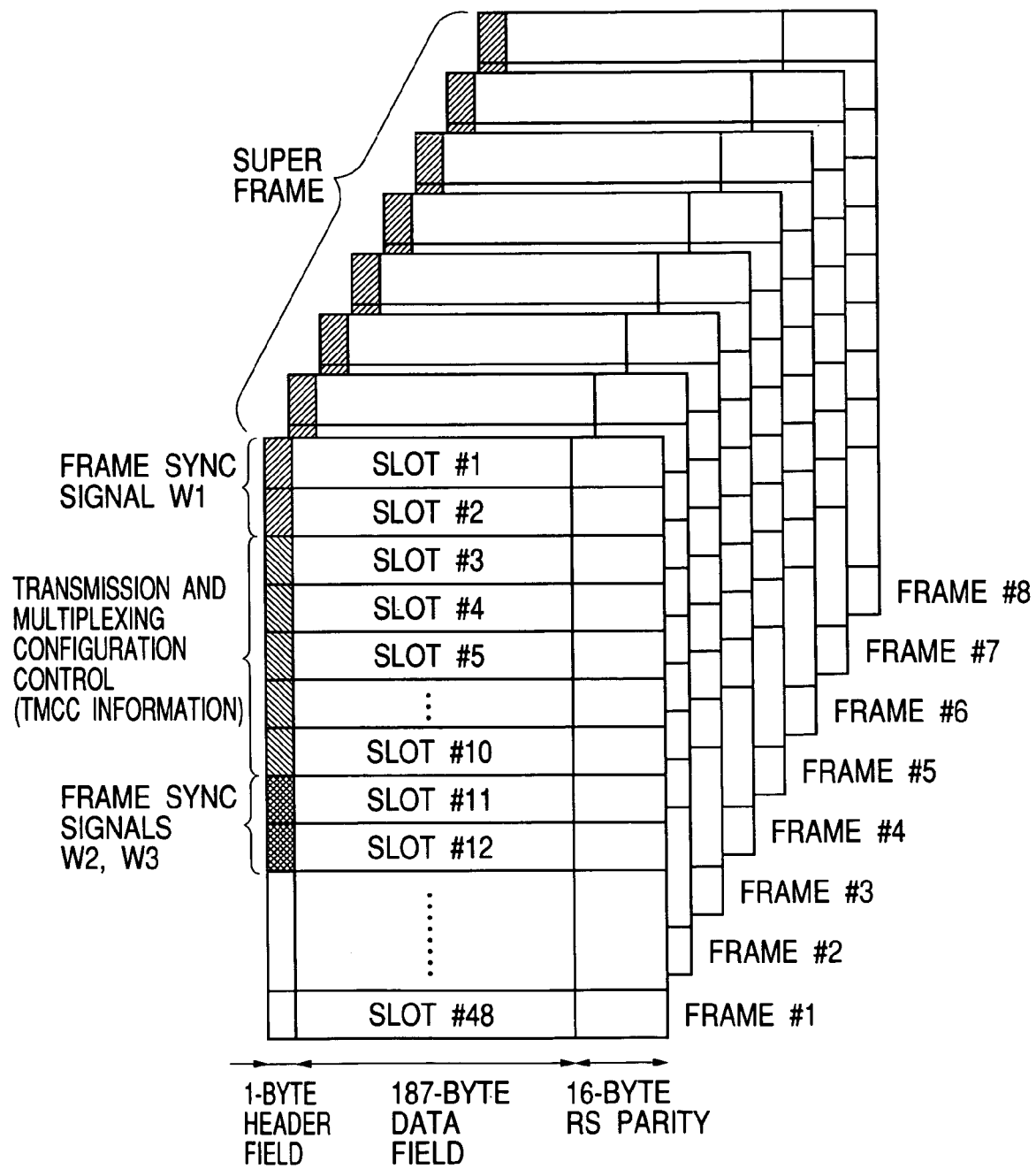
FIG. 1 is a diagram showing the structure of a super frame in which a digital signal of BS digital broadcasting is formed.

This digital broadcast receiver receives a BS (Broadcasting Satellite) digital broadcasting service by using, for example, an ISDB-S (Integrated Services Digital Broadcasting-Satellite), and can receive a digital signal constituting frames shown in FIG. 1.

As shown in FIG. 1, a digital signal transmitted by BS digital broadcasting forms a super frame made of symbol series having 78336 bytes. One super frame contains eight frames. Each frame is made of multiplexed eight transport streams at a maximum, and has 48 slots. Each slot is assigned a 204-byte TS packet having a PID (packet ID) corresponding to a program number and given by the transmission side.

Each super frame contains 96-byte transmission and multiplexing configuration control (TMCC) information.

The transmission and multiplexing configuration control information contains information of a modulation method of each frame and information for identifying the slot to which a TS packet is allocated. By reading this transmission and multiplexing configuration control information, the reception side can know the structure and the like of a transmitted digital signal.

Figure 2:
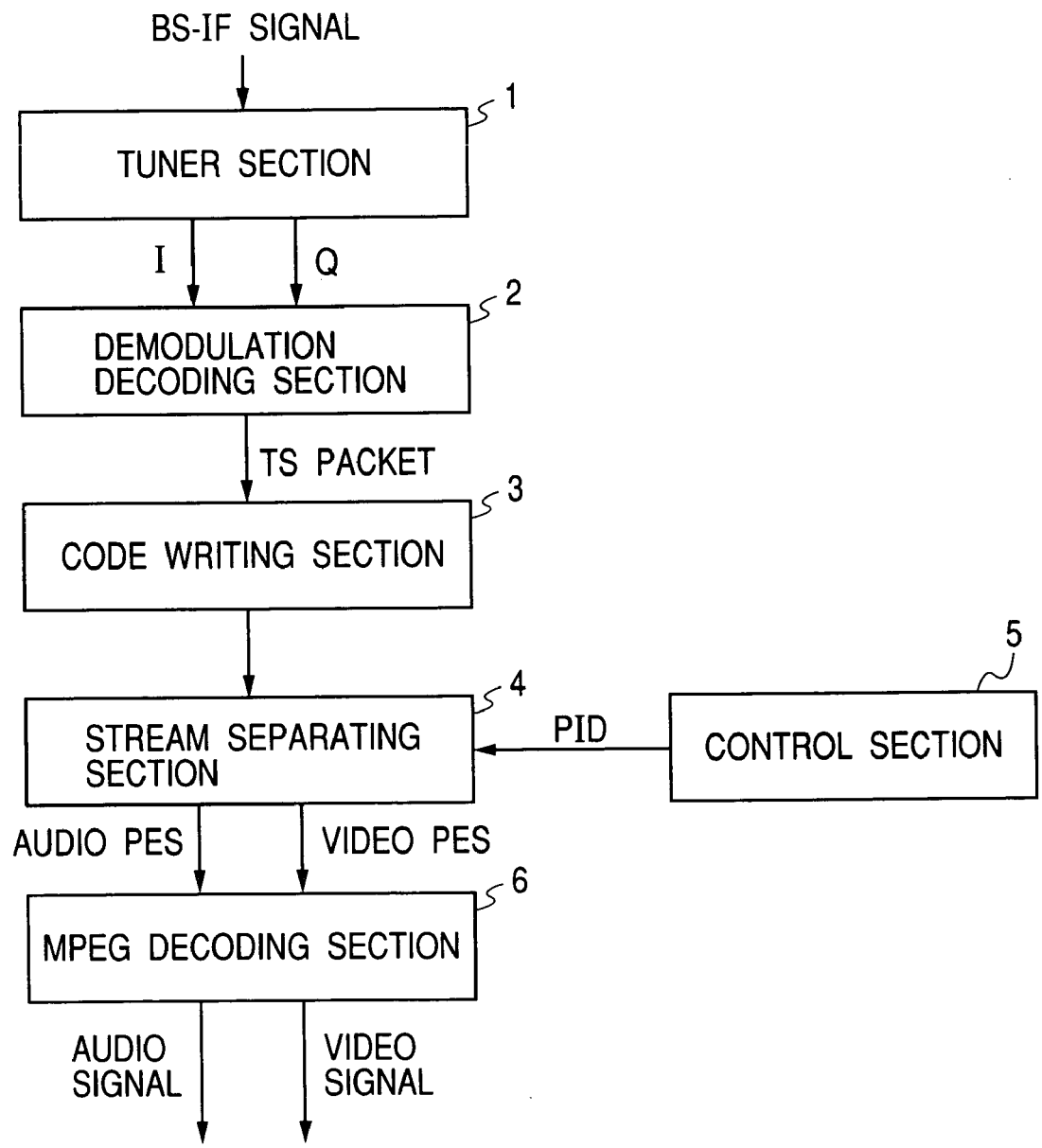
FIG. 2 is a diagram showing the structure of a digital broadcast receiver according to an embodiment of the invention.

FIG. 2 is a diagram showing the structure of a digital broadcast receiver according to the embodiment of the invention.

As shown, the digital broadcast receiver has a tuner section 1, a demodulation section 2, a code writing section 3, a stream separating section 4, a control section 5 and a MPEG decoding section 6.

The tuner section 1 is constituted of, for example, a quadrature detector, a local oscillator and the like. An ODU (OutDoor Unit) and the like of the tuner unit 1 down-converts a received radio wave to obtain a BS-IF (BS-Intermediate Frequency) signal and demodulate (recover) a baseband signal constituted of I (In-phase) components and Q (Quadrature) components.

The demodulation decoding section 2 is constituted of, for example, a demapper circuit, a descrambler, an RS (Reed-Solomon) error correction circuit and the like. The demodulation decoding section 2 demodulates the baseband signal to obtain a symbol series constituting a super frame and derive a TS packet which contains data for providing a service.

For example, the demodulation decoding section 2 demaps the baseband signal to obtain a symbol series which is subjected to deinterleaving and error correction. Thereafter, the transmission and multiplexing configuration control information is read to identify the structure of the symbol series of each super frame. In this case, the demodulation decoding section 2 checks, from the transmission and multiplexing configuration control information, whether the TS packet allocated to each slot corresponds to which one of the higher-level layer service and the lower-level layer service, and informs the check result to the code writing section 3. Namely, the demodulation decoding section 2 generates an identification signal for identifying the higher-level layer service or the lower-level layer service, for example, in accordance with the modulation method or the like of each frame identified from the transmission and multiplexing configuration control information, and sends the identification signal to the code writing section 3 synchronously with the timing of sending the TS packet.

The code writing section 3 writes a code in each TS packet supplied from the demodulation decoding section 2, the code identifying whether the TS packet corresponds to which one of the higher-level layer service and the lower-level layer service. For example, the code writing section 3 changes a 16-byte RS parity contained as an external code in each TS packet supplied from the demodulation decoding section 2, to a level layer identification code for identifying either the higher-level layer service or the lower-level layer service.

The stream separating section 4 executes a separation process of deriving a desired TS packet from TS packets written with the level layer identification code by the code writing section 3 and separating the TS packet into an audio PES (Packetized Elementary Stream) and a video PES.

The stream separating section 4 derives a desired TS packet by reading a PID in the packet header in each TS packet and the level layer identification code written in the area of the RS parity. Namely, the stream separating section 4 has a PID notified from the control section 5, derives the TS packet suitable for the level layer (higher-level layer or lower-level layer) of the service under reception, and separates the TS packet into the audio PES and video PES.

The control section 5 is constituted of, for example, a CPU (Central Processing Unit) and the like, and controls the operation of the stream separating section 4 and the like to make the digital broadcast receiver be able to receive a service such as audio, video and data broadcasting.

For example, in accordance with PSI (Program Specific Information) acquired from reception data, the control section 5 identifies PID corresponding to an externally designated program number and notifies PID to the stream separating section 4. Namely, the control section 5 identifies PID corresponding to a service to be received and notifies PID to the stream separating section 4.

The MPEG decoding section 6 decodes the audio PES and video PES in conformity with the specifications of MPEG-2, and outputs reproduced signals such as audio and video signals.

The operation of the digital broadcast receiver according to the embodiment of the invention will be described.

The digital broadcast receiver writes the level layer in a TS packet acquired from the received digital signal so that it is possible to judge whether the TS packet corresponds to which one of the higher-level layer service and the lower-level layer service.

A baseband signal demodulated by the tuner section 1 is sent to the demodulation decoding section 2 whereat the demodulated baseband signal is demapped to recover the symbol series transmitted from the transmission side. The demodulation decoding section 2 executes deinterleaving, descrambling, RS error correction and the like for the demodulated symbol series, and reads the transmission and multiplexing configuration control information.

The transmission and multiplexing configuration control information has the structure of the symbol series received later by two super frames. The demodulation decoding section 2 controls the decoding operation and the like in accordance with the transmission and multiplexing configuration control information.

Figure 3:
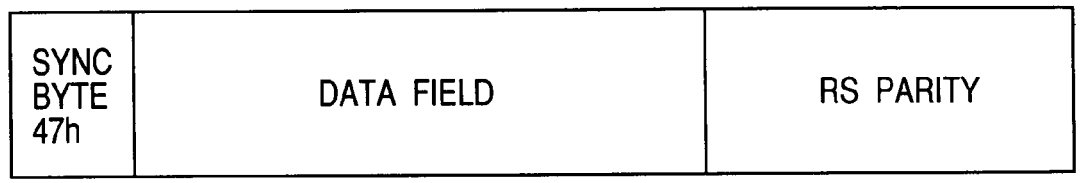
FIG. 3 is a diagram showing the structure of a TS packet.
Figure 3:
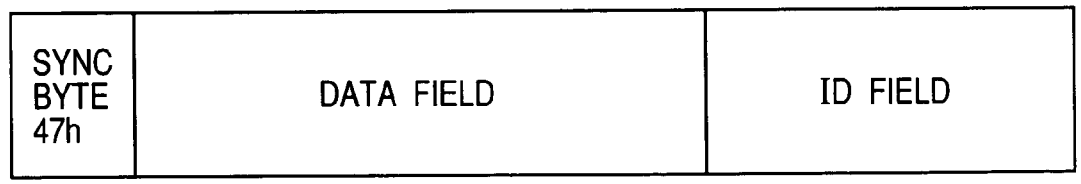

The demodulation decoding section 2 substitutes a synchronization byte ("47h" in hexadecimal notation) for the symbol series (header) of top one byte of each slot, and sends the TS packet such as shown in FIG. 3(a) to the code writing section 3.

In this case, for example, the demodulation decoding section 2 generates a signal for identifying the higher-level layer service or the lower-level layer service, for example, in accordance with the modulation method or the like of each frame identified from the transmission and multiplexing configuration control information, and sends the identification signal to the code writing section 3 synchronously with the timing of sending the TS packet.

The code writing section 3 changes the RS parity contained as an external code in each TS packet supplied from the demodulation decoding section 2, to the level layer identification code for identifying either the higher-level layer service or the lower-level layer service.

For example, when the code writing section 3 judges from the signal supplied from the demodulation decoding section 2 that the received TS packet is for the higher-level layer service, a symbol at the predetermined position in the RS parity shown in FIG. 3(a) is changed to "1" to synthesize the level layer identification code. When the code writing section 3 judges from the signal supplied from the demodulation decoding section 2 that the received TS packet is for the lower-level layer service, a symbol at the predetermined position in the RS parity shown in FIG. 3(a) is changed to "0" to synthesize the level layer identification code.

As shown in FIG. 3(b), the code writing section 3 sends the TS packet whose RS parity was changed to an ID field written with the level layer identification code to the stream separating section 4.

Next, in accordance with PID notified from the control section 5 and the level layer of the service to be received at the digital broadcast receiver, the stream separating section 4 executes a process of selecting a TS packet.

Namely, the stream separating section 4 reads PID in the header of the TS packet supplied from the code writing section 3, and selects the TS packet having the same PID as that notified from the control section 5. In this case, the stream separating section 4 reads the level layer identification code written in the TS packet to judge whether the TS packet corresponds to which one of the higher-level layer service and the lower-level layer service.

The stream separating section 4 selects the TS packet whose PID is coincident with that notified from the control section 5 and which matches the level layer of the service under reception, and separates the TS packet into the audio PES and video PES.

Even if the received data representative of PID has errors which cannot be corrected, the stream separating section 4 can identify the level layer of the service of each TS packet in accordance with the level layer identification code.

For example, when the lower-level layer service is received because the reception CNR is degraded, the stream separating section 4 selects the TS packet whose PID is coincident with that notified from the control section and which has the symbol "0" at the predetermined position in the ID field shown in FIG. 3(b).

In this manner, even if the TS packet of the higher-level layer service has errors which cannot be corrected and has PID coincident with that notified from the control section 5, the stream separating section 4 can judge from the level layer identification code that the TS packet corresponds to the higher-level layer service. Therefore, the stream separating section 4 will not erroneously judge that the TS packet of the higher-level layer service corresponds to the lower-level layer service, and will not separate the TS packet of the higher-level layer service into the audio PES and video PES. The stream separating section 4 can adequately receive the lower-level layer service.

When the higher-level layer service is to be received, the stream separating section 4 selects the TS packet whose PID is coincident with that notified from the control section 5 and which has the symbol "1" at the predetermined position in the ID field shown in FIG. 3(b).

The stream separating section 4 separates the TS packet selected as described above into the audio PES and video PES and sends them to the MPEG decoding section 6.

It is therefore possible to separate the TS packet into the audio PES and video PES by properly distinguishing between the higher-level layer service and the lower-level layer service, and it is not necessary to change the TS packet of the higher-level layer service to a null packet when the lower-level layer service is received. Namely, even if the reception CNR is degraded, the TS packet can be separated into the audio PES and video PES by reliably judging whether the received TS packet corresponds to which one of the higher-level layer service and the lower-level layer service, and it is possible to properly receive both the lower-level layer service and the higher-level layer service.

The stream separating section 4 sends the separated audio PES and video PES to the MPEG decoding section 6.

The MPEG decoding section 6 decodes the audio PES and video PES supplied from the stream separating section 4 to reproduce audio and video signals which are supplied to an output apparatus such as a television receiver.

As described so far, according to the invention, the level layer identification code for identifying either the higher-level layer service or the lower-level layer service is written in the TS packet demodulated from a received signal. It is therefore possible to reliably judge whether the TS packet corresponds to which one of the higher-level layer service and the lower-level layer service, before the separation process for reproduction of audio and video signals. Even if the reception CNR is degraded, both the lower-level layer service and the higher-level layer service can be received properly.

The invention is not limited only to the above-described embodiment, but various modifications and applications are possible.

For example, in the embodiment, although the level layer identification code is written in the TS packet, the invention is not limited only thereto.

Namely, for example, a portion of the transmission and multiplexing configuration control information read by the demodulation decoding section 2 may be written in the RS parity of the TS packet. In this case, the stream separating section 4 judges whether the TS packet corresponds to which one of the higher-level layer service and the lower-level layer service, in accordance with the modification method identified from the information written in the TS packet.

In the embodiment, although the TS packet corresponds to one of two services, the higher-level layer service and the lower-level layer service, it may correspond to one of a plurality of level layer services.

In this case, the information amount (bit number) of the level layer identification code is increased to identify the service level layer corresponding to the TS packet.

INDUSTRIAL APPLICABILITY

As described above, according to the present invention, it is possible to reliably judge whether the TS packet corresponds to which one of the higher-level layer service and the lower-level layer service and to receive both the lower-level layer service and the higher-level layer service even if the reception CNR is degraded.

What is claimed is:

1. A digital broadcast receiver for receiving a digital broadcast that provides a broadcast service consisting of a combination of a plurality of types of signal information, wherein different hierarchical level layers of modulation schemes depending on the types of signal information are applied to said broadcast service, said receiver comprising:

signal demodulating means for processing a received signal to demodulate a digital signal having a predetermined length of packet as a unit;

code synthesizing means for synthesizing a level layer identification code for each packet of the digital signal demodulated by said signal demodulating means, said level layer identification code identifying the level layer of each signal information in said broadcast service corresponding to that packet, and for adding the synthesized level layer identification code to that packet; and separating means for deriving a packet adapted to the level layer of each signal information in the received broadcast service, in accordance with the synthesized level layer identification code added to the packet by said code synthesizing means, and executing a separation process to output a reproduction signal without changing any packet having a specific level layer to a null packet.

2. The digital broadcast receiver according to claim 1, further comprising control means for notifying said separating means of an identification number corresponding to each signal information in the received broadcast service, among identification numbers allocated to packets on a transmission side, wherein said separating means operates so as to derive a packet whose identification number allocated to the packet with the level layer identification code synthesized by said code synthesizing means is coincident with the identification number notified from said control means and whose level layer identification code synthesized to the packet by said code synthesizing means is adapted to the level layer of each signal information in the received broadcast service.

3. The digital broadcast receiver according to claim 1 or 2, wherein said signal demodulating means operates so as to identify a modulation method to be used when each packet is transmitted from the transmission side, in accordance with transmission multiplexing configuration control information read from the demodulated digital signal, and to notify said code synthesizing means of the level layer of each signal information in said broadcast service corresponding to the identified modulation method; and wherein said code synthesizing means operates so as to synthesize for each packet the level layer identification code representative of the level layer of the service notified from said signal demodulating means.

4. The digital broadcast receiver according to claim 1 or 2, wherein said code synthesizing means operates so as to change a symbol at a predetermined position in a Reed-Solomon parity contained in a packet to the level layer identification code to thereby synthesize the level layer identification code for each packet.

5. A digital broadcast receiving method for receiving a digital broadcast that provides a broadcast service consisting of a combination of a plurality of types of signal information, wherein different hierarchical level layers of modulation schemes depending on the types of signal information are applied to said broadcast service, said method comprising the steps of:

demodulating a received signal to obtain a digital signal having a predetermined length of packet as a unit;

synthesizing a level layer identification code for identifying for each packet the level layer of each signal information in said broadcast service corresponding to that packet, and for adding the synthesized level layer identification code to that packet; and deriving a packet adapted to the level layer of each signal information in the received broadcast service, in accordance with the synthesized level layer identification code added to the packet, and executing a separation process to output a reproduction signal without changing any packet having a specific level layer to a null packet.

6. The digital broadcast receiving method according to claim 5,
wherein a modulation method to be used when each packet is transmitted from the transmission side, is identified in accordance with transmission multiplexing configuration control information read from the demodulated digital signal, and the level layer identification code indicative of the level layer of each signal information in said broadcast service corresponding to the identified modulation method, is synthesized to each packet; and wherein a separation process of outputting a reproduction signal is executed by deriving a packet whose identification number allocated to the packet with the synthesized level layer identification code is coincident with the identification number corresponding to the signal information in the received broadcast service and whose level layer identification code synthesized to the packet is adapted to the level layer of the signal information in the received service.

* * * * *